United States Patent
Leontaris et al.

(10) Patent No.: US 11,206,415 B1
(45) Date of Patent: Dec. 21, 2021

(54) SELECTABLE TRANSCODE ENGINE SYSTEMS AND METHODS

(71) Applicant: Apple Inc., Cupertino, CA (US)

(72) Inventors: Athanasios Leontaris, Cupertino, CA (US); Yaxiong Zhou, Fremont, CA (US); Francesco Iacopino, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/020,708

(22) Filed: Sep. 14, 2020

(51) Int. Cl.
*H04N 19/40* (2014.01)
*H04N 19/184* (2014.01)
*H04N 19/146* (2014.01)
*H04N 19/91* (2014.01)

(52) U.S. Cl.
CPC .......... *H04N 19/40* (2014.11); *H04N 19/146* (2014.11); *H04N 19/184* (2014.11); *H04N 19/91* (2014.11)

(58) Field of Classification Search
CPC .... H04N 19/40; H04N 19/184; H04N 19/146; H04N 19/91
See application file for complete search history.

(56) References Cited

U.S. PATENT DOCUMENTS

| | | | |
|---|---|---|---|
| 7,266,611 B2 | 9/2007 | Jabri et al. | |
| 9,106,888 B2 | 8/2015 | Chou | |
| 9,215,472 B2 | 12/2015 | Orr et al. | |
| 9,218,639 B2 | 12/2015 | Cote et al. | |
| 9,224,186 B2 | 12/2015 | Rygh et al. | |
| 9,224,187 B2 | 12/2015 | Cote et al. | |
| 9,270,999 B2 | 2/2016 | Cote et al. | |
| 9,292,899 B2 | 3/2016 | Schaub et al. | |
| 9,299,122 B2 | 3/2016 | Okruhlica et al. | |
| 9,305,325 B2 | 4/2016 | Cheng et al. | |
| 9,307,258 B2 | 4/2016 | MacInnis et al. | |
| 9,336,558 B2 | 5/2016 | Cote et al. | |
| 9,351,003 B2 | 5/2016 | Cote et al. | |
| 9,380,312 B2 | 6/2016 | Cote et al. | |
| 9,686,556 B2 | 6/2017 | Chou et al. | |
| 10,158,874 B2 | 12/2018 | Chou et al. | |
| 10,218,983 B2 | 2/2019 | Zhang | |
| 10,310,928 B1 * | 6/2019 | Hegar | G06F 11/0709 |
| 10,523,973 B2 | 12/2019 | Chou et al. | |
| 2006/0168637 A1 | 7/2006 | Vysotsky et al. | |

(Continued)

OTHER PUBLICATIONS

Digital Rapids Delivers New Version, Future Publishing Ltd, Sep. 30, 2007.

*Primary Examiner* — Tracy Y. Li
(74) *Attorney, Agent, or Firm* — Fletcher Yoder, P.C.

(57) ABSTRACT

An electronic device includes a video encoding pipeline configured to encode source image data. The video encoding pipeline includes a first transcode engine and a second transcode engine. The electronic device also includes processing circuitry configured to determine a target throughput for a bin stream and determine whether to encode the bin stream using only the first transcode engine or both the first and second transcode engines based on the target throughput. The processing circuitry is also configured to cause only the first transcode engine to encode the bin stream or both the first and second transcode engines to encode the bin stream based on determining whether to encode the bin stream using only the first transcode engine or both the first and second transcode engines.

20 Claims, 8 Drawing Sheets

(56) References Cited

U.S. PATENT DOCUMENTS

| | | | |
|---|---|---|---|
| 2007/0071097 A1* | 3/2007 | Koto | H04N 19/179 375/240.12 |
| 2012/0191876 A1 | 7/2012 | Johnson et al. | |
| 2013/0154810 A1* | 6/2013 | Ferren | G06F 3/0383 340/12.3 |
| 2014/0119457 A1 | 5/2014 | MacInnis et al. | |
| 2015/0023409 A1 | 1/2015 | Schierl et al. | |
| 2015/0092833 A1 | 4/2015 | Ku et al. | |
| 2015/0092843 A1 | 4/2015 | Millet et al. | |
| 2015/0092855 A1 | 4/2015 | Chou et al. | |
| 2015/0146794 A1 | 5/2015 | Hoang | |
| 2015/0271510 A1 | 9/2015 | Wen et al. | |
| 2015/0271531 A1 | 9/2015 | Wen et al. | |
| 2016/0007038 A1 | 1/2016 | Chou et al. | |
| 2016/0007050 A1 | 1/2016 | Rusert et al. | |
| 2016/0021385 A1 | 1/2016 | Chou et al. | |
| 2018/0091827 A1* | 3/2018 | Chou | H04N 19/174 |

\* cited by examiner

SELECTABLE TRANSCODE ENGINE SYSTEMS AND METHODS

BACKGROUND

The present disclosure relates generally to image data encoding and, more particularly, to transcode engines used to entropy encode image data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more image frames based on image data. For example, such electronic devices may include computers, mobile phones, portable media devices, tablets, televisions, virtual-reality headsets, and vehicle dashboards, among many others. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, a prediction encoding process may be used to compress image data. For example, a prediction encoding process may compress a portion of the image data by referencing another portion of the image data, thereby generating prediction encoded image data including symbols (e.g., syntax elements) that indicate the relationship between the portions of the image data. Additionally, an entropy encoding process may compress the prediction encoded image data by indicating the symbols based on frequency of occurrence in the prediction encoded image data. In this manner, the entropy encoding process may further compress the image data by generating entropy encoded image data that indicates more frequently occurring symbols using fewer bits.

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the captured image data to another electronic device and/or a network. As such, the ability to display and/or transmit in real-time or near real-time may be dependent at least in part on output rate of encoded image data. However, in some instances, image data throughput of the prediction encoding process and image data throughput of the entropy encoding process may vary, which may limit output rate of encoded image data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving determination of encoded image data, for example, by improving output rate of encoded image data to facilitate real-time or near real-time display and/or transmission. In some embodiments, a video encoding pipeline may generate encoded image data by compressing (e.g., encoding) source image data, for example to facilitate improving data storage efficiency and/or data transmission efficiency. To compress source image data, the video encoding pipeline may prediction encode the source image data to determine prediction encoded image data. In some embodiments, the prediction encoded image data may include prediction encoding parameters that indicate image data in one coding group (e.g., coding tree unit, coding unit, or macroblock) with reference to image data in another coding group.

Additionally, in some embodiments, the video encoding pipeline may determine filtering parameters expected to improve quality of decoded image data when applied by a decoding device. In some embodiments, the prediction encoding parameters and/or the filtering parameters may be indicated using one or more symbols (e.g., syntax elements). To facilitate further compression, the video encoding pipeline may entropy encode the symbols to determine encoded image data, which may subsequently be stored and/or transmitted.

To enable real-time or near real-time display and/or transmission, the video encoding pipeline may output encoded image data at a target output rate. However, in some instances, entropy encoding may be relatively non-deterministic while prediction encoding and/or determination of filtering parameters is relatively deterministic. As such, in some instances, entropy encoding may present a bottleneck that limits output rate of encoded image data.

Accordingly, the present disclosure provides techniques to improve entropy encoding throughput. In some embodiments, the video encoding pipeline may implement entropy encoding using multiple transcode engines that each processes a different coding group relatively in parallel. For example, a first transcode engine may entropy encode coding groups in even coding group rows while a second transcode entropy engine encodes coding groups in odd coding group rows. In this manner, utilizing N transcode engines may increase entropy encoding throughput approximately N times the throughput of a single transcode engine.

However, in some embodiments, entropy encoding different coding groups may be interdependent. For example, a coding group may be entropy encoded based at least in part on neighbor data (e.g., split flags, skip flags, and/or slice identifiers) and/or context data (e.g., table or model) determined while entropy encoding a previous coding group. As such, modifications may be made to enable multiple transcode engines to entropy encode relatively in parallel.

In some embodiments, a data (e.g., internal) buffer may be communicatively coupled between multiple transcode engines. For example, the data buffer may include a neighbor buffer that facilitates communication of neighbor data between a pair of transcode engines. Additionally, the data buffer may include a context buffer that facilitate communication of context data between a pair of transcode engines. In some embodiments, each transcode engine may store updated context data in the context buffer after processing the first two coding groups in a coding group row to facilitate implementing wavefront parallel processing (WPP).

Additionally, in some embodiments, a transcode engine may generate an output (e.g., bit) stream based at least in part on performed entropy encoding. Thus, operating multiple transcode engines may result in generating multiple output streams relatively in parallel. However, in some instances, an output (e.g., decoding) device may be expected to receive encoded image data as a single stream.

Thus, in some embodiments, a combined output stream may be generated by stitching together the multiple output streams. To facilitate determining the combined bit stream, in some embodiments, each transcode engine may determine characteristic data that indicates organizational relationship of the multiple bit streams in the combined bit stream. For example, the characteristic data may include position data that indicates position (e.g., location) of header data, beginning of a slice, end of a slice, beginning of a coding group row, end of a coding group row, beginning of a group of coding groups, end of a group of coding groups, beginning of a coding group, and/or end of a coding group in an output stream. Additionally or alternatively, the characteristic data may include size data that indicates size (e.g., number of bits) of a slice, a coding group row, a group of coding groups, and/or a coding group in an output stream.

Based at least in part on characteristic data, the combined output stream may be generated. For example, the combined output stream may be generated by alternating between reading multiple output streams stored in an external storage device based at least in part on the characteristic data. In this manner, the techniques described herein may facilitate improving output rate of encoded image data by improving entropy encoding throughput while maintaining compatibility with the rest of a video encoding pipeline and/or output (e.g., decoder) devices.

Furthermore, while utilizing multiple transcode engines may increase the amount of image data that can be encoded, using multiple transcode engines may increase the latency associated with encoding the image data, for example, relative to encoding image data using a single transcode engine. The techniques described herein enable a single transcode engine or multiple transcode engines to be used based on various factors associated with image data to be encoded and the electronic device performing the encoding. For example, as described herein, the number of transcode engines utilized may be selected based on throughput, latency, and/or power considerations. Accordingly, the techniques provided below enable image data to be encoded more quickly and in a manner that reduces power consumption.

BRIEF DESCRIPTION OF THE DRAWINGS

Various aspects of this disclosure may be better understood upon reading the following detailed description and upon reference to the drawings in which.

DETAILED DESCRIPTION

Figure 1:
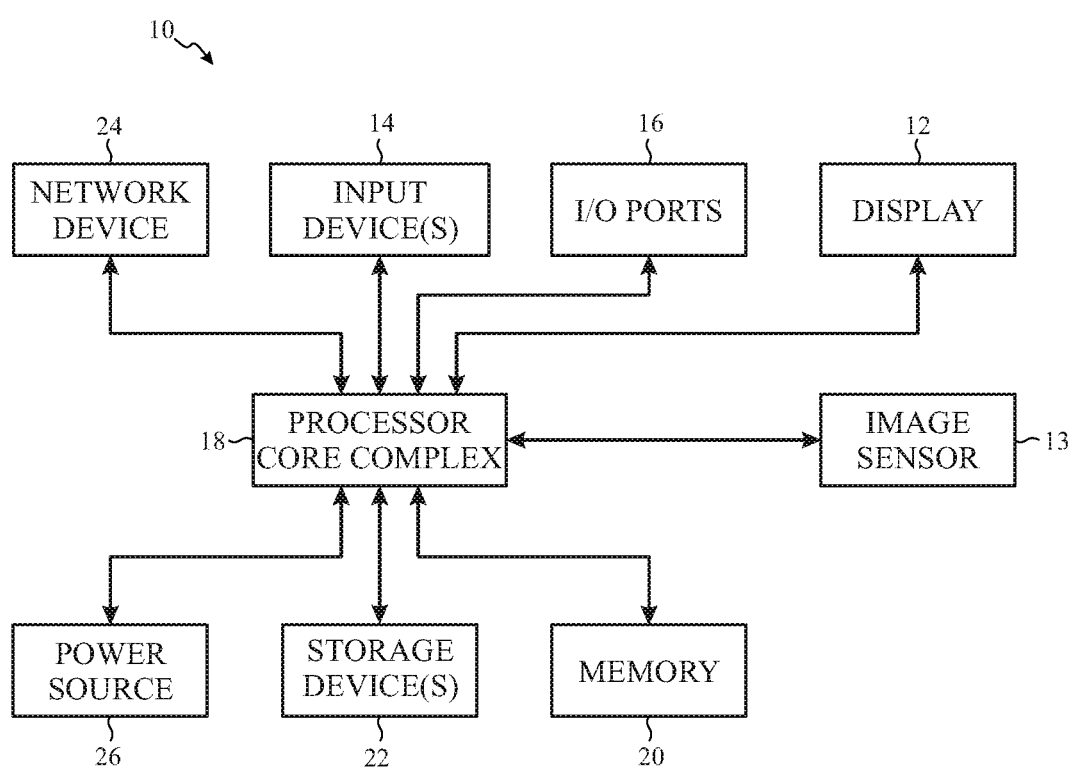
FIG. 1 is a block diagram of an electronic device used to encode and/or decode image data, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, an electronic device may facilitate visually presenting information by instructing an electronic display to display image frames based on image data. In some instances, the image data may be generated by an image sensor (e.g., digital camera) and stored in the electronic device. Additionally, when the image data is generated in a source external from the electronic device, the image data may be transmitted to the electronic device. As such, image data may be encoded (e.g., compressed) to reduce its size (e.g., number of bits), thereby improving data storage efficiency and/or data transmission efficiency.

In some instances, image data may be prediction encoded and, subsequently, entropy encoded. For example, since an image frame may change gradually, an intra-frame prediction encoding process may indicate image data of a first portion of the image frame by referencing image data of a second portion of the image frame. Additionally, since successively displayed image frames may change gradually, an inter-frame prediction encoding process may indicate image data in an image frame with reference to image data in one or more other image frames. In this manner, instead of directly compressing the image data, the prediction encoding process may generate prediction encoded image data prediction encoded image data. This may include symbols (e.g., syntax elements) that indicate the relationship between the portions of the image data.

Additionally, an entropy encoding process may compress the prediction encoded image data based at least in part on probability of symbols occurring in the prediction encoded image data. For example, symbols that occur more frequently may be indicated using fewer bits compared to symbols that occur less frequently. In this manner, the entropy encoding process may generate entropy encoded image data, which may then be stored and/or transmitted efficiently.

In some instances, image data may be captured for real-time or near real-time display and/or transmission. As such, the ability to display and/or transmit the image data in real-time or near real-time may be dependent at least in part on an output rate of encoded image data. However, in some instances, image data throughput of the prediction encoding process and image data throughput of the entropy encoding process may vary. For example, to encode a portion of image data, the prediction encoding process may have a deterministic processing duration while the entropy encoding process may have a non-deterministic processing duration, thereby resulting in variations in instantaneous image data throughput. To help illustrate, the prediction encoding process may have a constant throughput of 1 GB/s while the encoding process may have a throughput that varies between 500 MB/s and 2 GB/s. Thus, even when average throughput is approximately equal, the entropy encoding process may present a bottleneck that limits output rate of encoded image data, which may affect ability to display and/or transmit in real-time or near real-time.

Accordingly, the present disclosure provides techniques to improve throughput of an entropy encoding process, for example, to facilitate real-time or near real-time display and/or transmission. To facilitate improved throughput, in some embodiments, the entropy encoding process may be implemented using a transcode pipeline with multiple transcode engines. For example, the transcode pipeline may include a first transcode engine and a second transcode engine that each entropy encodes coding groups. As used herein, a "coding group" is intended to describe a sample (e.g., block) of image data corresponding to a group of display pixels and, thus, may be a coding tree unit (CTU), a coding unit (CU), a macroblock, or the like.

In operation, since a single input (e.g., bin) stream is received (e.g., retrieved), the transcode pipeline may route different portions of the input stream to different transcode engines. For example, the transcode pipeline may route portions of the input stream corresponding with even rows of coding groups to the first transcode engine and portions of the input stream corresponding with odd rows of coding groups to the second transcode engine. In this manner, multiple transcode engines in the transcode pipeline may encode different coding groups relatively in parallel, thereby improving throughput of the transcode pipeline compared to a transcode pipeline using a single transcode engine.

However, entropy encoding different coding groups may be interdependent. For example, a coding group may be entropy encoded based at least in part on neighbor data (e.g., split flags, skip flags, and/or slice identifiers) determined while processing one or more neighbor coding groups. Additionally, a row of coding groups may be entropy encoded based at least in part on a context data (e.g., model or table) determined while entropy encoding a previous row of coding groups.

As such, to enable use of multiple transcode engines, modification may be made to the transcode pipeline. In some embodiments, a neighbor buffer may facilitate communication of neighbor data between transcode engines. For example, when entropy encoding a first coding group row, the first transcode engine may determine and store neighbor data determined while processing coding groups in the first coding group row in the neighbor buffer. In this manner, when entropy encoding a second coding group row directly below the first coding group row, the second transcode engine may receive (e.g., retrieve) top neighbor data from the neighbor buffer and entropy encode coding groups in the second coding group row based at least in part on the top neighbor data. Since the multiple transcode engines operate relatively in parallel, utilizing the neighbor buffer may facilitate reducing data communication with an external storage device and, thus, associated effects on latency, communication bandwidth, and/or power consumption.

Additionally, a context buffer may facilitate communication of context data (e.g., model and/or table) between transcode engines. For example, after entropy encoding two coding groups in the first coding group row and updating a context table accordingly, the first transcode engine may store the updated context table in the context buffer. In this manner, the second transcode engine may receive (e.g., retrieve) the updated context table from the context buffer and initialize accordingly before entropy encoding the second coding group row. After entropy encoding two coding groups in the second coding group row and updating the context table accordingly, the second transcode engine may store the updated context table in the context buffer, thereby enabling the first transcode engine to initialize accordingly before entropy encoding a third coding group row. In this manner, the context buffer may facilitate improving encoding efficiency by enabling transcode engines to initialize based on previously processed coding units and/or providing wavefront parallel processing (WPP).

In some embodiments, each of the transcode engines may store an output (e.g., bit) stream in a different portion of the external storage device. For example, the first transcode engine may store a first output stream generated by entropy encoding the even coding group rows in a first portion of the external storage device. On the other hand, the second transcode engine may store a second output stream generated by entropy encoding the odd coding group rows in a second portion of the external storage device. However, encoded image data is generally processed (e.g., decoded) as a single output stream.

As such, modifications may be made to the transcode pipeline to facilitate determining a combined output stream that combines the output streams generated by multiple transcode engines. In some embodiments, each transcode engine may determine characteristics of its generated output stream, such a position (e.g., location) of headers in the output stream and/or size (e.g., number of bits) of one or more coding groups in the output stream. For example, when a transcode engine detects a slice header in an input stream, the transcode engine may store position data that indicates the position of the slice header in a position queue. Additionally, when a transcode engine reaches the end of a coding group row, the transcode engine may store size data that indicates the size of the coding group row in a size queue.

To generate the combined output stream, in some embodiments, the output streams generated by multiple transcode engines may be stitched together based at least in part on the determined characteristics. For example, the combined output stream may be generated by reading a first output stream from the external storage device until a first coding group row size is reached, reading a second output stream from the external storage device until a second coding group row size is reached, reading the first output stream from the external storage device until a third coding group row size is reached, reading the second output stream from the external storage device until a fourth coding group row size is reached, and so on. Additionally, the combined output stream corresponding with a slice may be generated by switching between reading the first output stream starting a slice header position until a slice size is reached. In this manner, the techniques described herein may facilitate improving the output rate of encoded image data by improving the throughput of a transcode pipeline while maintaining compatibility with the rest of a video encoding pipeline and/or output (e.g., decoder) devices.

Furthermore, while utilizing multiple transcode engines may increase the throughput of a transcode pipeline, utilizing multiple transcode engines may also cause image data (e.g., a bin stream) to be encoded with a higher latency than would be experienced if the image data were encoded using a single transcode engine. For example, because utilizing multiple transcode engines to encode image data results in multiple bit streams that will be combined to generate a single bit stream, in some cases, it may be faster to encode the image data using a single transcode engine to generate a single bit stream compared to using multiple transcode engines to generate multiple bit streams and combining the multiple bit streams into a single bit stream. As such, the present disclosure describes techniques that may be utilized to control whether image data is encoded using one or multiple transcode engines of a transcode pipeline.

Bearing the foregoing in mind, an electronic device 10 that may utilize an electronic display 12 to display image frames based on image data and/or utilize an image sensor 13 to capture image data is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, the image sensor 13, one or more input devices 14, one or more input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

The network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

The power source 26 may provide electrical power to one or more component in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

The I/O ports 16 may enable the electronic device 10 to interface with other electronic devices. For example, when a portable storage device is connected, the I/O ports 16 may enable the processor core complex 18 to communicate data with the portable storage device. In this manner, the I/O ports 16 may enable the electronic device 10 to output encoded image data to the portable storage device and/or receive encoded image data from the portable storage device.

The input devices 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from the display pixels to present visual representations of information, such as a graphical user interface (GUI) of an operating system, an application interface, a still image, or video content, by displaying image frames based at least in part on corresponding image data. In some embodiments, the image data may be received from other electronic devices 10, for example, via the network interface 24 and/or the I/O ports 16. Additionally or alternatively, the image data may be generated by electronic device 10, for example, based on visual representations of proximate physical features captured by the image sensor 13.

To improve data storage and/or data communication efficiency, the image data may be encoded (e.g., compressed), for example, by the electronic device 10. Once generated or received, the encoded image data may be stored in local memory 20. Accordingly, to display a corresponding image frame, the processor core complex 18 may retrieve encoded image data from local memory 20, decode the encoded image data, and instruct the electronic display 12 to display the image frame based on the decoded image data.

Figure 2:
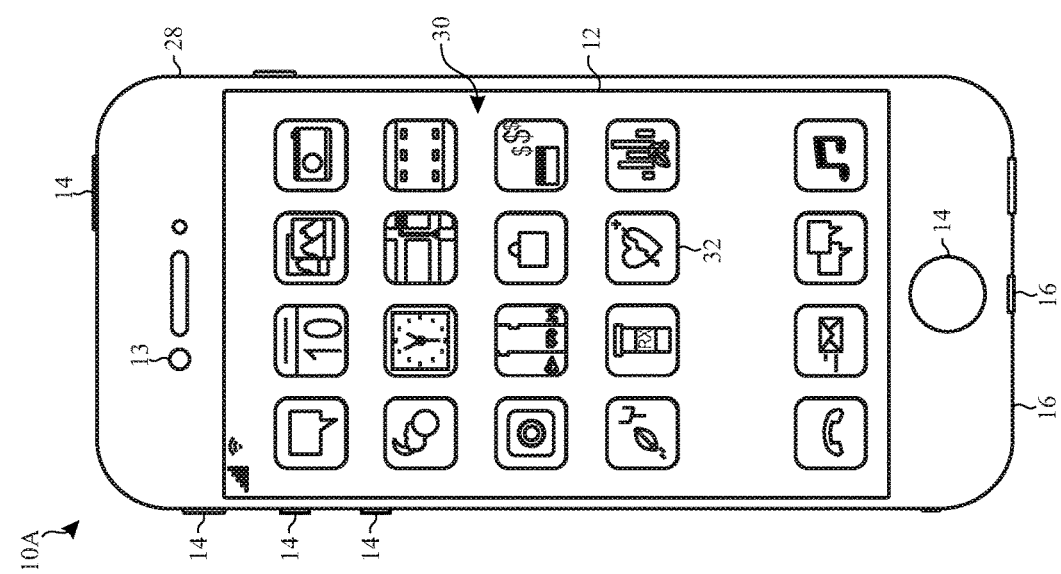
FIG. 2 is one example of the electronic device of FIG. 1 in the form of a handheld electronic device, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

The handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 28.

Figure 3:
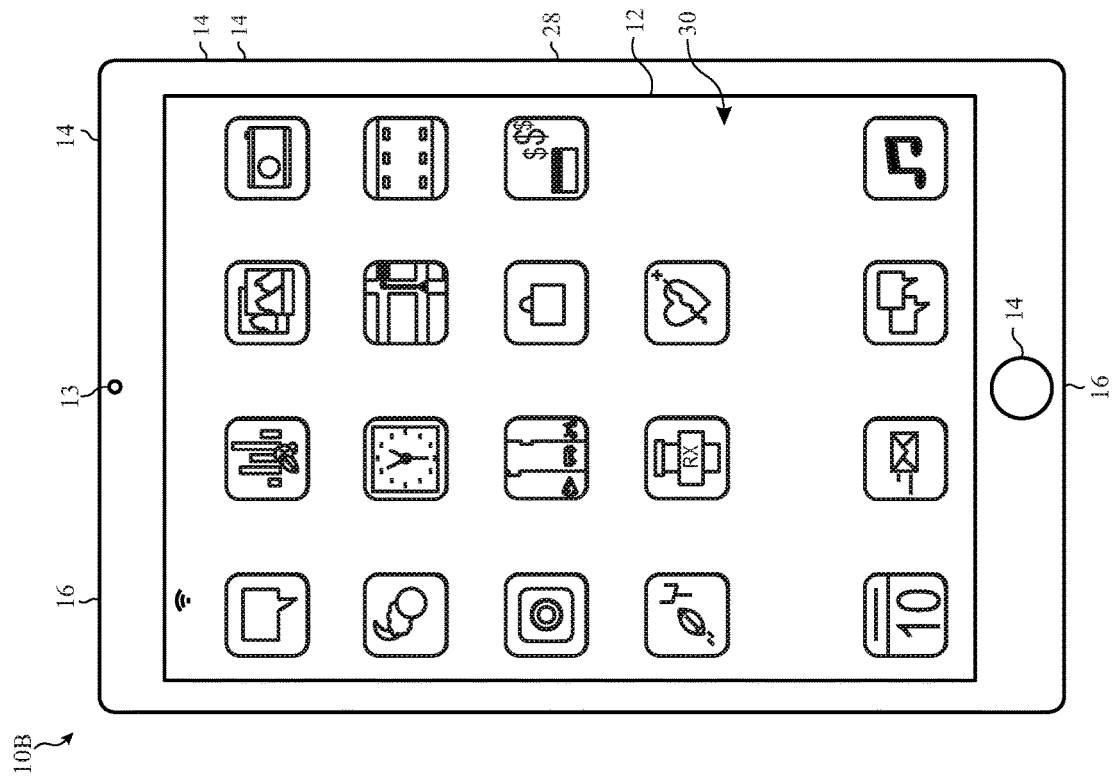
FIG. 3 is another example of the electronic device of FIG. 1 in the form of a tablet device, in accordance with an embodiment of the present disclosure.
Figure 4:
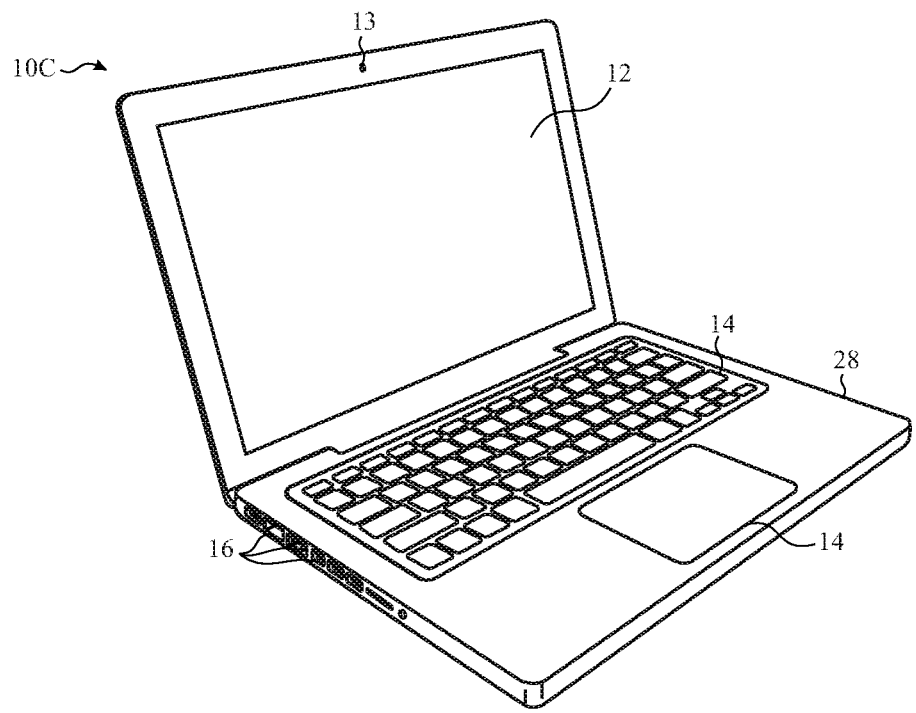
FIG. 4 is another example of the electronic device of FIG. 1 in the form of a computer, in accordance with an embodiment of the present disclosure.
Figure 5:
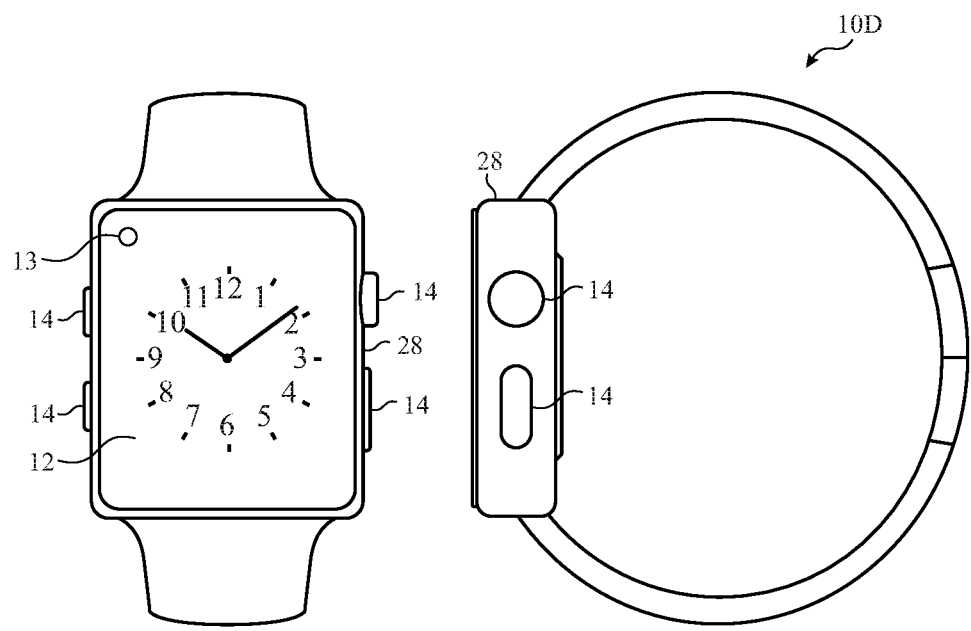
FIG. 5 is another example of the electronic device of FIG. 1 in the form of a watch, in accordance with an embodiment of the present disclosure.

Another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, image data may be encoded (e.g., compressed) to facilitate reducing resource (e.g., storage and/or communication) usage. Additionally, to facilitate real-time or near real-time display and/or transmission, the duration between the generation of image data and display of image frames based on the image data may be limited. For example, image data captured by the image sensor 13 may be displayed on the electronic display 12 with minimal delay to enable a user to determine physical features proximate the image sensor 13 in real-time or near real-time. Additionally, image data generated by the electronic device 10 may be transmitted (e.g., broadcast) to one or more other electronic devices 10 to enable real-time or near real-time streaming. As such, an amount of time available to encode image data may be limited—particularly as the resolution of image frames increases and/or refresh rate of electronic displays 12 increases.

Figure 6:
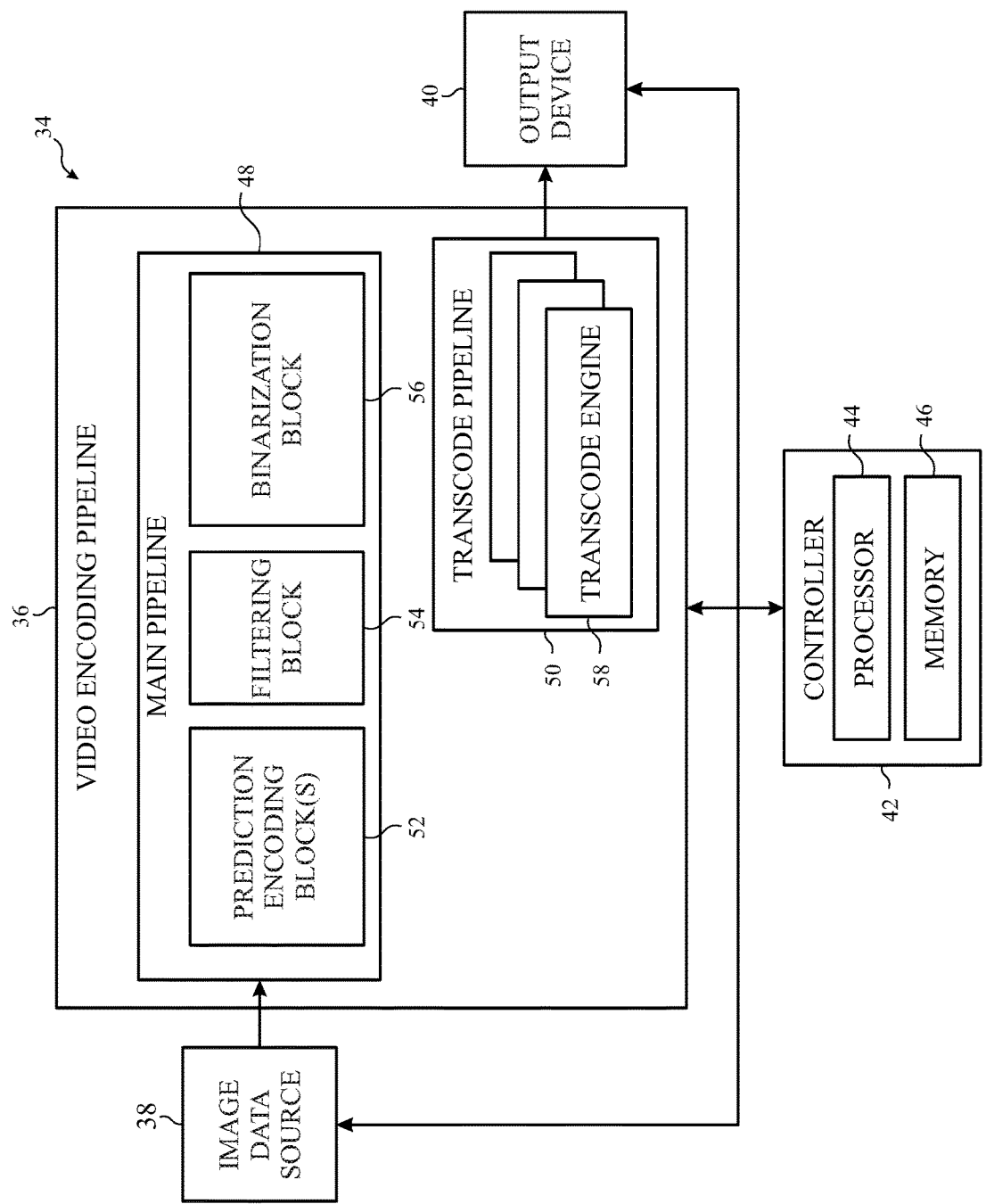
FIG. 6 is a block diagram of a video encoding pipeline including a transcode pipeline used to encode image data, in accordance with an embodiment of the present disclosure.

To help illustrate, one embodiment of a portion 34 of an electronic device 10 including a video encoding pipeline 36 that may be used to encode image data is shown in FIG. 6. In some embodiments, at least a portion of the video encoding pipeline 36 may be implemented by executing instructions stored in a tangible, non-transitory, computer-readable medium using the processor core complex 18 and/or one or more other processing units. Additionally, in some embodiments, at least a portion of the video encoding pipeline 36 may be implemented based on circuit connections formed in processing circuitry.

As depicted, the portion 34 of the electronic device 10 also includes an image data source 38, an output device 40, and a controller 42. The controller 42 may control operation of the video encoding pipeline 36, the image data source 38, and/or the output device 40. The controller 42 may include a controller processor 44 and controller memory 46. The controller processor 44 may execute instructions stored in the controller memory 46. Thus, the controller processor 44 may be included in the processor core complex 18 and/or one or more other processing units. Additionally, the controller memory 46 may be included in the local memory 20, the main memory storage device 22, another tangible, non-transitory, computer-readable medium, or any combination thereof.

The video encoding pipeline 36 is communicatively coupled to the image data source 38. In this manner, the video encoding pipeline 36 may receive source image data from the image data source 38. Thus, in some embodiments, the image data source 38 may be the image sensor 13, an image signal processor (ISP), and/or any other suitable device that generates source image data.

Additionally, the video encoding pipeline 36 is communicatively coupled to the output device 40. In this manner, the video encoding pipeline 36 may output encoded (e.g., compressed) image data to the output device 40, for example, for storage and/or transmission. Thus, in some embodiments, the output device 40 may include the local memory 20, the main memory storage device 22, the network interface 24, the I/O ports 16, the controller memory 46, or any combination thereof.

The video encoding pipeline 36 may be implemented using multiple parallel pipelines. For example, the video encoding pipeline 36 may include a main pipeline 48 and a transcode pipeline 50. In particular, the main pipeline 48 may facilitate encoding source image data by performing various image data processing functions. To simplify discussion, the functions are divided between various blocks (e.g., circuitry or modules) in the main pipeline 48 namely, one or more prediction encoding blocks 52, a filtering block 54, and a binarization block 56.

In particular, the prediction encoding blocks 52 may prediction encode source image data to generate prediction encoded image data. Thus, in some embodiments, the prediction encoding blocks 52 may include a motion estimation block, an inter-frame prediction block, an intra-frame prediction block, a mode decision block, a chroma reconstruction block, and/or a luma reconstruction block. Additionally, in some embodiments, the prediction encoding block 52 may successively prediction encode coding groups of source image data received from the image data source 38.

To prediction encode a coding group, the prediction encoding blocks 52 may determine prediction encoding parameters that indicate the coding group with reference to other image data. In some embodiments, the prediction encoding parameters may include a prediction mode (e.g., inter-frame prediction mode or intra-frame prediction mode), a quantization coefficient, configuration of prediction groups (e.g., units) in a coding group, configuration of transform groups (e.g., units) in a coding group, and/or prediction residuals. For example, the prediction encoding blocks 52 may determine an intra-frame prediction mode that indicates the coding group with reference to image data in the same image frame or an inter-frame prediction mode that indicate the coding group with reference to image data in a different image frame.

In any case, the prediction encoding blocks 52 may apply the prediction mode to determine a predicted coding group, for example, based at least in part on the configuration of the prediction groups. Additionally, the prediction encoding blocks 52 may determine the prediction residual based at least in part on differences between the predicted coding group and the source coding group. Furthermore, the prediction encoding blocks 52 may determine reconstructed image data, which provides an indication of decoded image data expected to be determined by a decoding device and, thus, may be used to facilitate prediction encoding subsequent coding groups. In some embodiments, the prediction encoding blocks 52 may facilitate determining the reconstructed image data by applying a forward transform, a forward quantization, an inverse quantization, and an inverse transform to the prediction residual based at least in part on the configuration of the transform groups and/or the quantization coefficients.

To improve the quality of decoded image data, the filtering block 54 may determine filtering parameters that may be applied by a decoding device. In some embodiments, the filtering parameters may include deblock filtering parameters and/or sample adaptive offset (SAO) parameters. For example, the filtering block 54 may process the reconstructed image data to determine deblock filtering parameters, which when applied to decoded image data is expected to reduce likelihood of perceivable blocking visual artifacts. Additionally or alternatively, the filtering block 54 may process the reconstructed image data and/or deblocked image data to determine sample adaptive offset parameters, which when applied to decoded image data is expected to reduce likelihood of perceivable banding and/or ringing (e.g., edge) visual artifacts.

The prediction encoding parameters and/or the filtering parameters may be communicated to a decoding device, for example, via a storage device and/or a communication network. The prediction encoding parameters and/or filtering parameters may be indicated using symbols (e.g., syntax elements). For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

As described above, data storage efficiency and/or data communication efficiency may be further improved by entropy encoding the symbols. To facilitate entropy encoding, in some embodiments, the binarization block 56 may binarize the symbols. For example, the binarization block 56 binarize a symbol by mapping the symbol to a corresponding binary representation, which includes one or more bins (e.g., "0" or "1"). In some embodiments, the binarization block 56 may generate the binary representation using exp-golomb coding, fixed length coding, truncated unary coding, and/or truncated rice coding. In this manner, the binarization block 56 may generate a bin stream, which may be entropy encoded by the transcode pipeline 50.

In some embodiments, the processing duration of a coding group by the main pipeline 48 may be relatively deterministic while processing duration of the coding group by the transcode pipeline 50 may be relatively non-deterministic. In other words, although average throughput may be approximately equal, instantaneous throughput of the transcode pipeline 50 may vary from that of the main pipeline 48. For example, throughput of the main pipeline 48 may be a relatively constant 1 GB/s while throughput of the transcode pipeline 50 varies between 500 MB/s and 2 GB/s.

To reduce the likelihood of back pressuring the main pipeline 48, in some embodiments, the transcode pipeline 50 may be de-coupled from the main pipeline 48. For example, the binarization block 56 may store the bin stream in an external storage device, such as the controller memory 46, via write direct memory access (DMA). Subsequently, the transcode pipeline 50 may retrieve the bin stream from the external storage device, for example, via read direct memory access. In this manner, the transcode pipeline 50 may determine and entropy encode the bin stream to determine a bit stream supplied to an output device 40, such as the external storage device, a decoding device, and/or a communication network.

In some embodiments, increasing throughput of the transcode pipeline 50 may further reduce likelihood of back pressuring the main pipeline 48 and/or improve the overall throughput of the video encoding pipeline 36, which may facilitate real-time or near real-time display and/or transmission. To improve the throughput, the transcode pipeline 50 may utilize multiple transcode engines 58 that each entropy encode different portions of the bin stream relatively in parallel. For example, the transcode pipeline 50 may include two transcode engines 58 to approximately double throughput, three transcode engines 58 to approximately triple throughput, or N transcode engines 58 to increase throughput approximately N times the throughput of a single transcode engine 58.

Operating multiple transcode engines 58 relatively in parallel may also increase power consumption, for example, due to storing data in and/or retrieving data from an external storage device via direct memory access. Furthermore, while operating multiple transcode engines 58 increases the maximum throughput of the transcode pipeline 50, operating multiple transcode engines 58 in parallel may also increase latency, for example, because utilizing multiple transcode engines 58 may generate multiple bit streams which will be combined to generate a single bit stream and/or because the transcode engines 58 may use data generated by other transcode engines 58. To enable the transcode pipeline 50 to provide high throughput (e.g., when processing relatively higher quality (e.g., high resolution) image content) while also enabling the transcode pipeline to operate with a relatively low latency, the transcode pipeline 50 may dynamically adjust the number of transcode engines 58 operating on the bin stream. For example, the transcode pipeline 50 may power gate transcode engines 58 based at least in part on a target (e.g., desired) throughput of the transcode pipeline 50 (and/or the video encoding pipeline 36 as a whole) and/or a target latency of the transcode pipeline 50. In this manner, the transcode pipeline 50 may reduce power consumption while achieving a target throughput (e.g., output rate of encoded image data) and latency.

However, before proceeding to discuss adjusting the number of transcode engines 58 utilized, utilizing multiple transcode engines 58 of the transcode pipeline 50 will be discussed. Operating multiple transcode engines 58 relative in parallel may increase operational complexity, for example, due to encoding dependency between different (e.g., neighboring) coding groups. For example, a coding group may be entropy encoded based at least in part on processing of a top neighbor coding group and/or a left neighbor coding group. As such, to facilitate operating multiple transcode engines 58 relatively in parallel, modifications may be made to the transcode pipeline 50.

Figure 7:
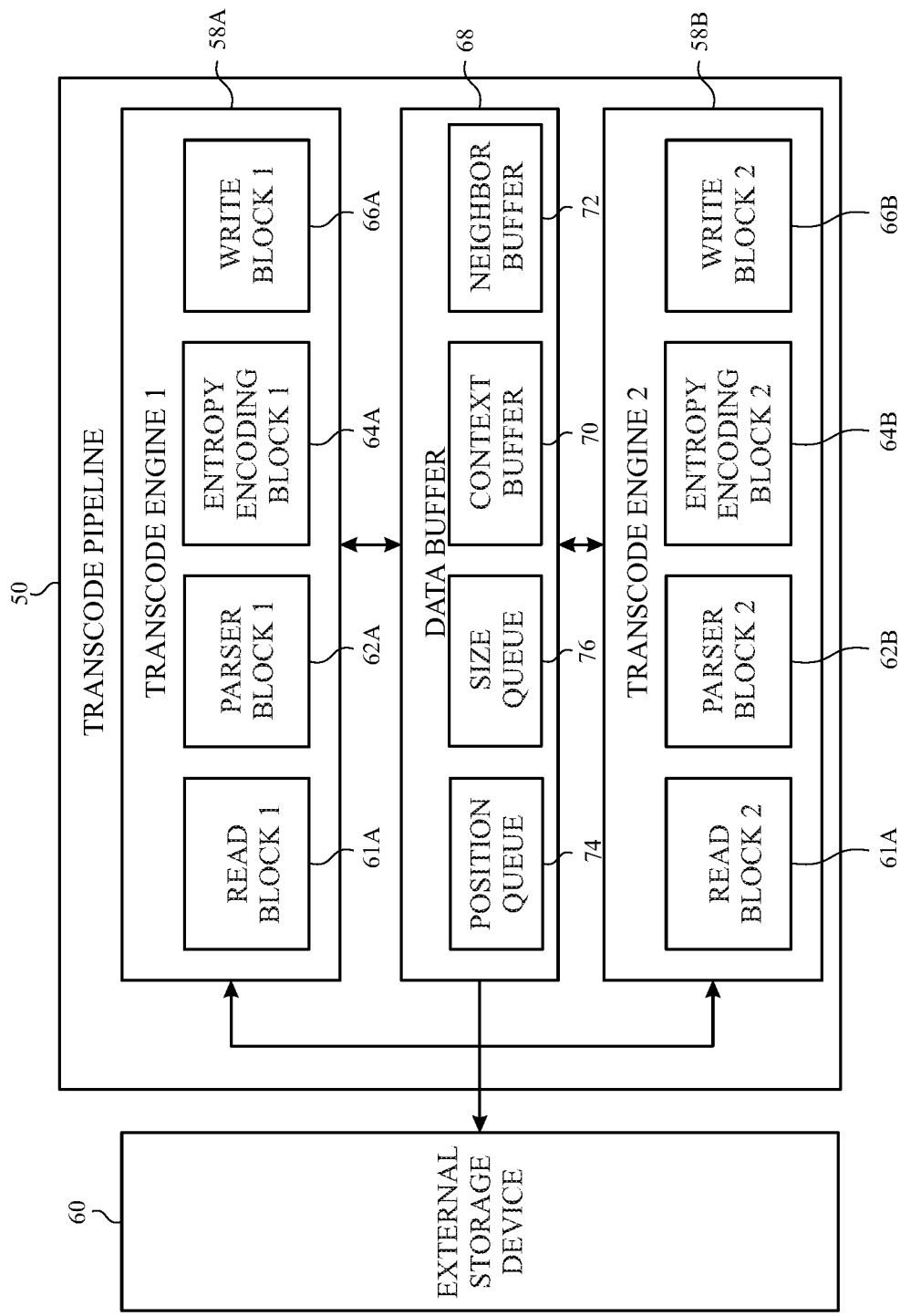
FIG. 7 is a block diagram of an example of the transcode pipeline of FIG. 6, in accordance with an embodiment of the present disclosure.

To help illustrate, one embodiment of a transcode pipeline 50 including multiple transcode engines 58—namely, a first transcode engine 58A and a second transcode engine 58B—is shown in FIG. 7. Additionally, in the depicted embodiment, the transcode pipeline 50 is communicatively coupled to an external storage device 60. In some embodiments, the external storage device 60 may be dynamic random-access memory (DRAM) in the controller memory 46, the local memory 20, the main memory storage device 22, and/or a separate tangible, non-transitory, computer-readable medium.

The external storage device 60 may communicate a bin stream generated by the binarization block 56 from the main pipeline 48 to the transcode pipeline 50. The main pipeline 48 may write (e.g., store) the generated bin stream to the external storage device 60 via write direct memory access. Additionally, the transcode pipeline 50 may read (e.g., retrieve) the bin stream from the external storage device 60, for example, via read direct memory access.

To facilitate determining the bin stream, in some embodiments, each transcode engine 58 in a transcode pipeline 50 may include a read block 61. For example, in the depicted embodiment, the first transcode engine 58A includes a first read block 61A and the second transcode engine 58B includes a second read block 61B. In this manner, each transcode engine 58 may relatively independently read different portions of the bin stream, which may facilitate entropy encoding the different portions relatively in parallel. For example, in some embodiments, the first read block 61A may retrieve portions of the bin stream corresponding to even numbered coding group rows and the second read block 61B may retrieve portions of the bin stream corresponding to odd numbered coding group rows.

To facilitate entropy encoding, in some embodiments, each transcode engine 58 in a transcode pipeline 50 may include a parser block 62 and an entropy encoding block 64. For example, in the depicted embodiment, the first transcode engine 58A includes a first parser block 62A and a first entropy encoding block 64A. Similarly, the second transcode engine 58B includes a second parser block 62B and a second entropy encoding block 64B.

In particular, a parser block 62 may parse bins read into a transcode engine 58 to identify one or more bins corresponding with each symbol. Subsequently, the entropy encoding block 64 may entropy encode the bins to determine encoded bits and, thus, a bit stream. With regard to the depicted embodiment, the first entropy encoding block 64A may entropy encode bins corresponding with even numbered coding group rows while the second entropy encoding block 64B may entropy encode regular bins corresponding with even numbered coding group rows.

In some embodiments, an entropy encoding block 64 may compress bins into bits using arithmetic coding. To facilitate arithmetic coding, an entropy encoding block 64 determine a context data (e.g., model or table), which indicates probability of the bin being a "1" or "0" based on previous bins. Additionally, based on the probability, an entropy encoding block 64 may divide a range into two sub-ranges and determine an encoded bit such that it falls within one of two sub-ranges to select the actual value of the bin. In this manner, multiple bins may be represented by a single bit, thereby improving encoding efficiency (e.g., reduction in size of source image data).

Thus, as described above, entropy encoding bins corresponding to a coding group may be dependent on entropy encoding of bins corresponding to other coding groups. For example, since neighboring coding groups may be relatively similar, the bins used to indicate neighboring coding groups may be relatively similar. As such, in some embodiments, context data may be updated after entropy encoding each coding group. In this manner, a coding group may be entropy encoded based at least in part on processing of neighboring (e.g., top and/or left) coding groups to facilitate improving encoding efficiency. For example, context data used to entropy encode a coding group row may be initialized based on a context model used to entropy a previous (e.g., above) coding group row. Additionally, the context data may be updated based on neighbor data determined by entropy encoding a left neighbor coding block and/or a top neighbor coding block.

However, when using multiple transcode engines 58, neighboring coding groups may be entropy encoded by different transcode engines 58. For example, with regard to the depicted embodiment, the second transcode engine 58B may entropy encode a coding group and a left neighbor coding group while the first transcode engine 58A entropy encodes a top neighbor coding group. Additionally, the first transcode engine 58A may entropy encode a coding group and a left neighbor coding group while the second transcode engine 58B entropy encodes a top neighbor coding group.

In other words, to facilitate entropy encoding a bin stream using multiple transcode engines 58, data communication may be provided between the transcode engines 58. In some embodiments, data communication may be provided using the external storage device 60 via direct memory access. Thus, in some embodiments, each transcode engine 58 in a transcode pipeline 50 may include a write block 66A. For example, with regard to the depicted embodiment, the first transcode engine 58A includes a first write block 66A and the second transcode engine 58B includes a second write block 66B.

In this manner, a write block 66 may write (e.g., store) updated context models and/or neighbor data to the external storage device 60, for example, via write direct memory access. Additionally, a read block 61 may read (e.g., retrieve or receive) the updated context models and/or neighbor data from the external storage device 60, for example, via read direct memory access. However, in some instances, writing to and/or reading from the external storage device 60 may increase latency, power consumption, and/or implemented communication bandwidth.

Thus, the transcode pipeline 50 may additionally or alternatively include a data buffer 68 to facilitate data communication between multiple transcode engines 58. In the depicted embodiment, the data buffer 68 includes a context buffer 70, a neighbor buffer 72, a position queue 74, and a size queue 76. In some embodiments, the context buffer 70 may facilitate communication of updated context data between multiple transcode engines 58. For example, the first transcode engine 58A may update and store context data in the context buffer 70 after entropy encoding two coding groups in a first coding group row. In this manner, the second transcode engine 58B may retrieve the updated context model from the context buffer 70 before entropy encoding a second coding group row.

Context data may be updated based at least in part on neighbor data determined while processing a coding group. Thus, in some embodiments, the neighbor data may include one or more split flags that indicate whether a coding group is sub-divided into one or more smaller coding groups and/or size of the one or more smaller coding groups. For example, four 2-bit split flags be used to indicate number and/or size of coding units (CUs) in a coding tree unit (CTU). Additionally, in some embodiments, the neighbor data may include one or more skip flags that indicate whether prediction encoding is skipped for one or more portion of a coding group. For example, four 1-bit skip flags may be used to indicate whether prediction encoding is skipped for one or more coding units in a coding tree unit. Furthermore, in some embodiments, the neighbor data may include a slice identifier that indicates the slice in which a coding group is included.

Based at least in part on neighbor data, context data to be used to entropy encode a subsequent coding group may be determined. For example, bins encountered when processing the split flags and/or the skip flags may be used to adjust bin probabilities in the context data. Additionally, in some embodiments, the slice identifier may facilitate determining whether neighbor coding groups are in the same slice and, thus, whether neighbor data corresponding with a neighbor coding group should be used to update context data.

Thus, the neighbor buffer 72 may facilitate communication of neighbor data between multiple transcode engines 58. For example, the first transcode engine 58A may determine neighbor data based on processing coding groups in the first coding group row and store the neighbor data in the neighbor buffer 72. In this manner, the second transcode engine 58B may retrieve neighbor data corresponding with a top neighbor coding group from the neighbor buffer 72 before processing each coding group in the second coding group row.

Based at least in part on the context data and/or the neighbor data, an entropy encoding block 64 may determine encoded bits. As described above, in some embodiments, the external storage device 60 may function as the output device 40. Thus, in such embodiments, a write block 66 may write the encoded bits as a bit stream to the external storage device 60, for example, via write direct memory access.

When utilizing multiple transcode engines 58, this may result in multiple bit streams being generated and stored in the external storage device 60. For example, the first transcode engine 58A may generate and store a first bit stream corresponding to coding groups in even numbered coding group rows. On the other hand, the second transcode engine 58B may generate a store a second bit stream corresponding to coding groups in odd numbered coding group rows.

Because multiple transcode engines 58 may operate relatively in parallel, each transcode engine 58 may store its generated bit stream in a different portion of the external storage device 60. For example, the first transcode engine 58A may store the first bit stream in a first portion of the external storage device 60 while the second transcode engines 58B stores the second bit stream in a second portion of the external storage device 60. However, encoded image data is generally processed (e.g., decoded) as a single bit stream.

As such, in some embodiments, each transcode engine 58 may determine characteristics of its generated bit stream to facilitate stitching multiple bit streams into a combined (e.g., single) bit stream. In some embodiments, the characteristics may include position data that, for example, indicates a position (e.g., location) of header data, a beginning of a slice, an end of a slice, a beginning of a coding group row, an end of a coding group row, a beginning of a group of coding groups, an end of a group of coding groups, a beginning of a coding group, and/or an end of a coding group in a bit stream. Additionally, in some embodiments, the characteristics may include size data that, for example, indicates a size (e.g., number of bits) of a slice, a coding group row, a group of coding groups, and/or a coding group in a bit stream.

In some embodiments, a transcode engine 58 may store position data in the position queue 74 and size data in the size queue 76. Additionally, in some embodiments, the position queue 74 may include multiple queues that each stores position data related to one slice, one coding group row, one group of coding groups, and/or one coding group. Furthermore, in some embodiments, the size queue 76 may include multiple queues that each stores size data related to one slice, one coding group row, one group of coding groups, and/or one coding group. Based at least in part on the position data and/or the size data, a combined bit stream may be read from the external storage device 60, for example, to a decoding device.

Thus, to operate the transcode pipeline 50 utilizing multiple transcode engines 58 in parallel, a bin stream is determined, portions of the bin stream are routed to different transcode engines 58 (e.g., even coding group rows to one transcode engine 58 and odd coding group rows to another transcode engine 58), generating multiple bit streams in parallel (e.g., from entropy encoding the differently routed portions of the bit stream), and determining characteristics of the multiple bit streams. The characteristics may include position data that indicates position (e.g., location) of header data, beginning of a slice, end of a slice, beginning of a coding group row, end of a coding group row, beginning of a group of coding groups, end of a group of coding groups, beginning of a coding group, and/or end of a coding group in a bit stream. Additionally or alternatively, the characteristics may include size data that indicates a size (e.g., number of bits) of a slice, a coding group row, a group of coding groups, and/or a coding group in a bit stream. Furthermore, the multiple bit streams may be combined into a single bit stream (e.g., by combining encoded bit streams for the even and odd coding group rows utilizing based on the determined characteristics). Such operations may be implemented based on circuit connections formed in the video encoding pipeline 36 and/or the transcode pipeline 50. Additionally, these operations may be implemented by executing instructions stored in a tangible, non-transitory, computer-readable medium, such as the controller memory 46, using a processor, such as the controller processor 44.

Figure 8:
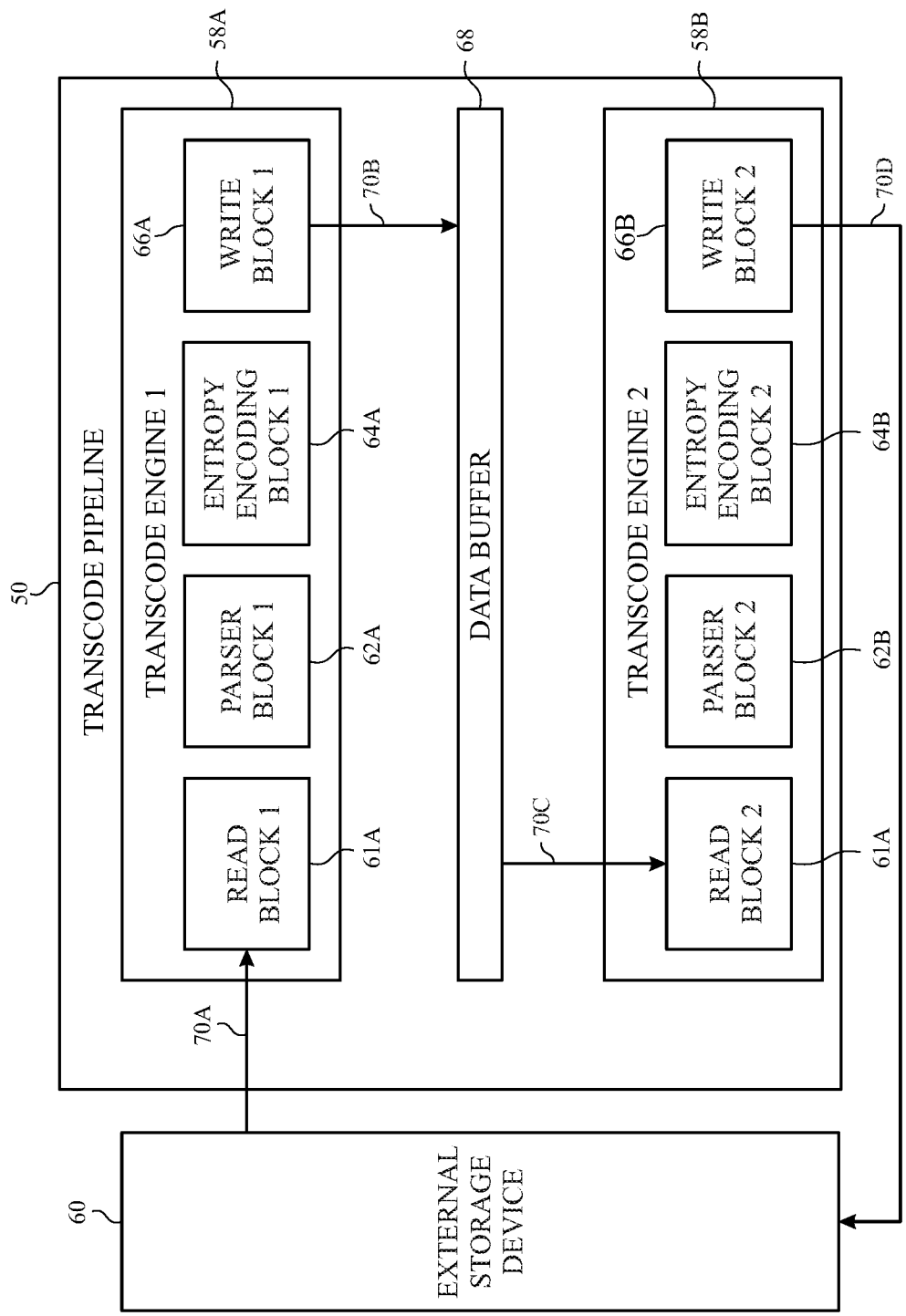
FIG. 8 is a block diagram illustrating a flow of data through the transcode pipeline and external storage device of FIG. 7 when multiple transcode engines are utilized to encode image data, in accordance with an embodiment of the present disclosure.

Keeping this in mind, FIG. 8 is a schematic diagram illustrating a flow of data (represented by lines 70A, 70B, 70C, 70D) through the transcode pipeline 50 and the external storage device 60 when multiple transcode engines 58 (e.g., first transcode engine 58A and second transcode engine 58B) are utilized. As indicated by line 70A, the first read block 61A of the first transcode may receive data (e.g., a bin stream or portion of a bin stream) from the external storage device 60. For instance, the read block 61A may have direct memory access to the external storage device 60 and receive a bin stream via the direct memory access. The first transcode engine may process the bin stream, and the first write block 66A may write generated data to the data buffer 68 (represented by line 70B) as discussed above. The second read block 61B of the second transcode engine 58B may read data from the data buffer 68 (represented by line 70C) and utilize the data, for example, to encode a different portion of a bit stream. For instance, as noted above, the read block 61B may also receive data from the external storage device 60 (e.g., a portion of a bin stream for even coding group rows). The second transcode engine 58B may process (e.g., encode via the second entropy encoding block 64B) a bin stream based on the data received from the data buffer 68. The second write block 66B may send data (e.g., encoded bin streams) to the external storage device 60 (represented by line 70D).

Figure 9:
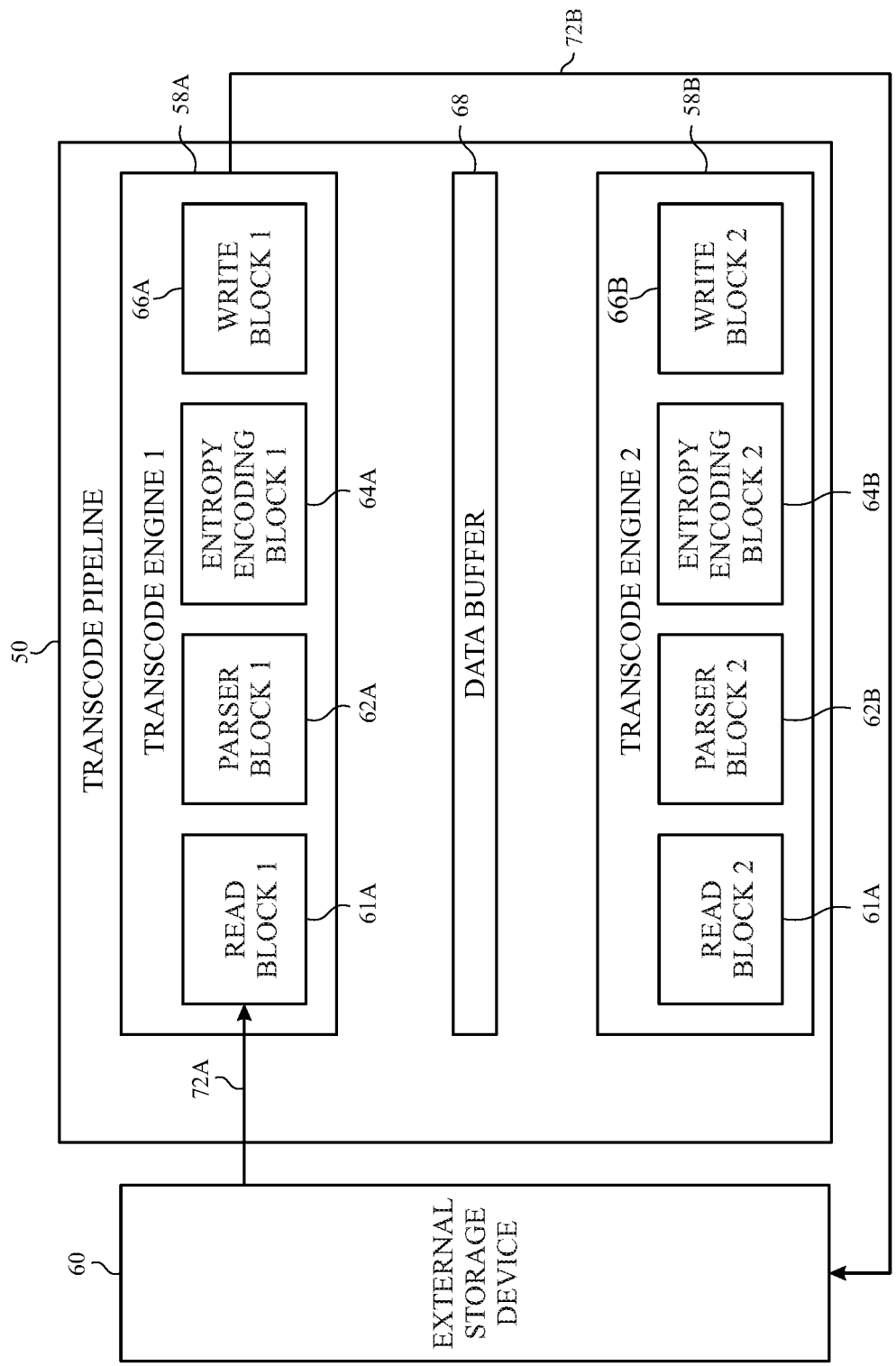
FIG. 9 is a block diagram illustrating a flow of data through the transcode pipeline and external storage device of FIG. 7 when a single transcode engine is utilized to encode image data, in accordance with an embodiment of the present disclosure.

As discussed in more detail below, in some cases, a single transcode engine 58 of the transcode pipeline 50 may be utilized to encode image data. In other words, rather than utilizing both the first transcode engine 58A and the second transcode engine 58B, only one transcode engine 58 (e.g., the first transcode engine 58A) may be utilized. FIG. 9 illustrates a flow of data (represented by lines 72A, 72B) through the transcode pipeline 50 and the external storage device 60 when a single transcode engine 58 (e.g., the first transcode engine 58A) is utilized to encode a bin stream. As represented by line 72A, the first read block 61A may receive a bin stream. As described above, the first entropy encoding block 64A may encode the bit stream. The first write block 66A may write the encoded bit stream to the external storage device 60. Accordingly, when only a single transcode engine 58 is utilized, data from the first transcode engine 58A may be provided to the external storage device 60 rather than the data buffer 68.

Keeping the discussion of FIG. 8 and FIG. 9 in mind, utilizing multiple transcode engines 58 increases throughput of the transcode pipeline 50. That is, when multiple transcode engines 58 are used, the amount of image data that can be processed is higher than an amount of image data that can be processed when only a single transcode engine 58 is utilized. However, in some cases, utilizing two transcode engines 58 may increase the latency of the transcode pipeline 50. In other words, relative to utilizing a single transcode engine 58, it may take more time to process image data (e.g., for a smaller amount of image data) when multiple transcode engines 58 are utilized.

Figure 10:
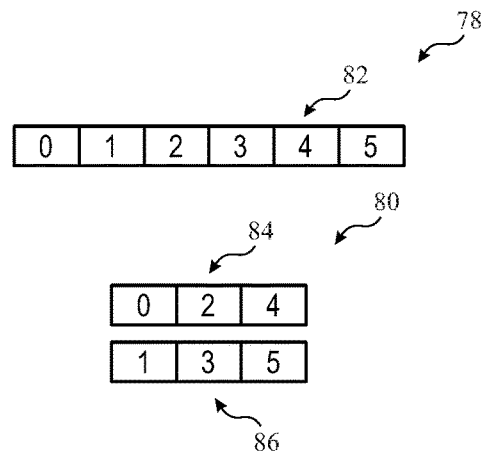
FIG. 10 is a diagrammatic representation of encoded image data that may be generated by the transcode pipeline of FIG. 7, in accordance with an embodiment of the present disclosure.

FIG. 10 illustrates encoded image data 78 and encoded image data 80. The encoded image data 78 may be generated by the first transcode engine 58A when only a single transcode engine 58 is utilized to encode image data. More specifically, the encoded image data 78 may be an encoded bit stream 82 that is generated by the first entropy encoding block 64A and provided to the external storage device 60 via the first write block 66A. Accordingly, when utilizing a single transcode engine 58, a single bit stream of data (e.g., encoded bit stream 82) having bits arranged in order may be generated and written to the external storage device 60.

The encoded image data 80 includes a first encoded bit stream 84 and a second encoded bit stream 86 generated by the transcode pipeline 50 when multiple transcode engines 58 are utilized to encode image data. More specifically, the first encoded bit stream 84 may be a bit stream generated by the first transcode engine 58A encoding even coding row groups of image data, and the second encoded bit stream 86 may be a bit stream generated by the second transcode engine 58B encoding odd coding row groups of image data. Accordingly, when utilizing two transcode engines 58, the transcode pipeline 50 may generate two different bit streams.

As discussed above, the bit steams generated by the transcode pipeline 50 may be combined into a single bit stream, for example, so that an encoded bit stream includes encoded image data in order. However, utilizing multiple transcode engines 58 may entail performing operations that are not performed while only using a single transcode engine 58. For example, when using multiple transcode engines 58, image data is divided into several bit streams to be encoded by multiple transcode engines 58, the multiple transcode engines 58 generate separate bit streams (e.g., encoded bit streams 84, 86), and the encoded bit streams 84, 86 may be processed to be combined into a single encoded bit stream. Thus, in certain situations, such as when processing relatively smaller amounts of image data (e.g., video data) or image data that has a relatively lower bit rate (e.g., a bit rate below a threshold bit rate), utilizing two transcode engines 58 may take more time than to encode the image data compared to if a single transcode engine 58 were used to generate a single bit stream. That is, utilizing two transcode engines 58 may have a higher latency than using a single transcode engine 58 due to the additional operations associated with utilizing two transcode engines 58.

Figure 11:
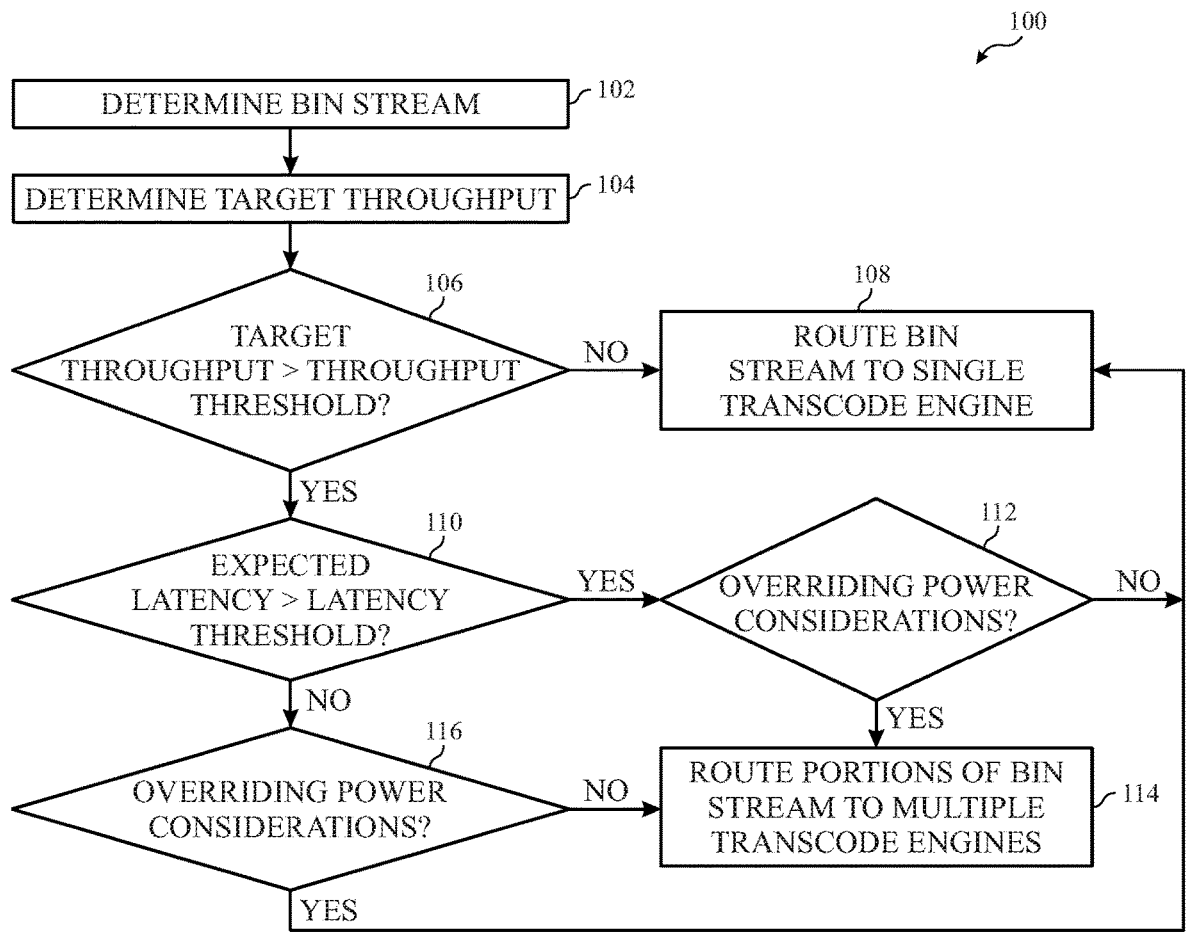
FIG. 11 is a flow diagram of a process for controlling the transcode pipeline of FIG. 7, in accordance with an embodiment of the present disclosure.

As discussed below, the number of transcode engines 58 of the transcode pipeline 50 utilized may be modified based on characteristics of the bin stream (e.g., image data to be entropy encoded by the transcode pipeline 50) and other considerations, such as desired throughput and latency of the transcode pipeline 50 as well as power consumption. Bearing this in mind, FIG. 11 is a flow diagram of a process 100 for controlling the transcode pipeline 50. In particular, the process 100 may be utilized to adjust the number of the transcode engines 58 that are utilized to process bin streams. The process 100 may be implemented based on circuit connections formed in the video encoding pipeline 36 and/or the transcode pipeline 50. Additionally or alternatively, the process 100 may be implemented by processing circuitry, such as the controller processor 44, executing instructions stored in a tangible, non-transitory, computer-readable medium, such as the controller memory 46.

At process block 102, the controller 42 determines a bin stream to be encoded by the transcode pipeline 50. For example, as described above, in some embodiments, the main pipeline 48 may generate and store the bin stream in the external storage device 60. As discussed below, the controller 42 may make various determinations about the bin stream and control how the bin stream will be encoded (e.g., using a single transcode engine 58 or multiple transcode engines 58).

At process block 104, the controller 42 determines a target throughput for the bin stream. In one example, the target throughput may be an expected or actual bit rate of image data (e.g., the bin stream determined at process block 102) to be encoded by the transcode pipeline 50. In one embodiment, the controller 42 may determine the target throughput by estimating a bit rate of the image data to be encoded. For example, the controller memory 46 may include instructions that the controller 42 executes to estimate the bit rate utilizing an equation or algorithm stored in the controller memory 46. Such an equation or algorithm may account for the resolution (e.g., image width (in pixels) multiplied by image width (in pixels)), a color depth (e.g., bit depth) of the image content (e.g., 8 bit, 10 bit, 12 bit, 14 bit, 16 bit, etc.), and a frame rate of the content. For example, to estimate the bit rate of image content to be encoded, the controller 42 may multiply the number of pixels per frame of image content by the number of bits per frame (which can be determined based on the bit depth) to determine a first product, and the controller 42 may multiply the first product by the frame rate to determine an estimated bit rate.

At decision block 106, the controller 42 determines whether the target throughput is greater than a throughput threshold. The throughput threshold may be pre-determined value stored in memory (e.g., controller memory 46). The throughput threshold may also be a value that is equal to a maximum throughput of a transcode engine 58 that would be utilized when only a single transcode engine 58 is utilized. For instance, in the example above in which the first transcode engine 58A is utilized when only one transcode engine 58 of the transcode pipeline 50 is used, the throughput threshold may be equal to the maximum throughput (e.g., bit rate) of the first transcode engine 58A. That is, the throughput threshold may be equal to the highest bit rate at which the first transcode engine 58 is able to process (e.g., encode) image data. In some cases, the throughput threshold may be a particular percentage or fraction (e.g., two thirds, 70%, 75%, 80%, 85%, 90%) of the maximum bit rate at which the first transcode engine 58A is configured to process image data. Furthermore, in some embodiments, the controller 42 may determine the throughput threshold by multiplying the maximum throughput of the first transcode engine 58A by a fraction or percentage selected by the controller 42 based on one or more factors such as power consumption of the electronic device 10 or an amount of power remaining in the power source 26 (e.g., in cases in which the power source is a battery). Furthermore, in embodiments of the electronic device 10 in which the power source 26 is a battery, the one or more factors may include whether the power source 26 is charging.

When the controller 42 determines that the target throughput is less than (or equal to) the throughput threshold, at process block 108, the controller 42 may cause the bin stream to be routed to a single transcode engine, such as the transcode engine 58A. In other words, when the target throughput is determined to be less than (or equal to) the throughput threshold, the bin stream may be encoded using a single transcode engine 58. In particular, the controller 42 may cause the first read block 61A to retrieve (e.g., read) the bin stream from the external storage device, for example, via read direct memory access. After receiving the bin stream, the single transcode engine (e.g., transcode engine 58A) may encode the bin stream to generate an encoded bit stream as discussed above. Furthermore, when only a single transcode engine 58 is used to encode the bin stream, the transcode engine(s) 58 included in the transcode pipeline 50 that are not utilized to encode the bit stream may be to be powered off to reduce the amount of power consumed by the transcode pipeline 50.

However, if at decision block 106 the controller determines that target throughput is greater than the throughput threshold, at decision block 110, the controller 42 determines whether an expected latency (e.g., amount of time to process the bin stream) is greater than a latency threshold. More specifically, the expected latency may be a latency that would be expected to occur if multiple transcode engines 58 were utilized to encode image data (e.g., the bin stream). The controller 42 may determine the expected latency based on the bit rate of the image content to be encoded. For example, the controller memory 46 may include a lookup table that correlates bit rates to expected latencies. That is, the lookup table may indicate different latencies associated with different bit rates of image data. The controller 42 may determine the expected latency by determining a latency for a bit rate included in the lookup table that is closest in value to the bit rate of the image data or by interpolating between two bit rate values (e.g., a bit rate higher than the bit rate of the image data to be encoded and a bit rate lower than the bit rate of the image data to be encoded). Accordingly, the controller 42 may reference the lookup table to determine an expected latency for the bit stream.

The latency threshold may be a pre-determined value stored in the controller memory 46. The latency threshold may be a value that corresponds to a latency that would be expected to occur if a single transcode engine 58 were utilized to encode image data (e.g., the bin stream). More specifically, the latency threshold may be a value the controller 42 calculates or a value the controller 42 selects from among several values. For instance, the controller memory 46 may include a lookup table indicating different latency threshold values associated with different bit rates of image data. The controller 42 may determine the latency threshold by determining a latency for a bit rate included in the lookup table that is closest in value to the bit rate of the image data or by interpolating between two bit rate values (e.g., a bit rate higher than the bit rate of the image data to be encoded and a bit rate lower than the bit rate of the image data to be encoded). In some embodiments, the controller 42 may also determine the threshold latency based on other parameters, such as an application or program that is running on the electronic device 10. For example, for certain applications or programs, lower latencies may be prioritized compared to other applications or programs. As one example, a camera application (e.g., an application that generates image data using the image sensor 13), virtual reality application, or augmented reality application, may prioritize latency. Conversely, latency may not be prioritized for other applications, such as an application utilized to view images or videos previously recorded. The lookup table may include several threshold latency values for each bit rate, such as a value for when latency is prioritized and a value for when latency is not prioritized. In such a case, the controller 42 may determine whether the application running on the electronic device 10 is an application for which latency should be prioritized and then select or determine the latency threshold (e.g., based on bit rate and whether latency should be prioritized). In another embodiment, there may be a latency threshold value associated with bit rates and applications. Accordingly, the controller 42 may utilize the lookup table to determine the latency threshold based on the bit rate of the image content to be encoded and an application running on the electronic device 10.

If at decision block 110 the controller 42 determines that the expected latency is greater than the latency threshold, at decision block 112, the controller 42 determines whether there are any overriding power considerations present that might indicate that multiple transcode engines 58 should be used even through the expected latency is greater than the latency threshold. In particular, the overriding power considerations associated with decision block 112 may include whether power source 26 (e.g., a battery) of the electronic device 10 is charging or an amount of power that the power source 26 can supply (e.g., battery life). When the power source 26 is charging or the amount of power remaining on the power supply 26 is above a threshold amount (e.g., 75%, 80%, 85%, 90%, 95%) of a maximum battery life of the power supply 26, the controller 42 may determine that overriding power considerations are present.

If at decision block 112 the controller 42 determines that overriding power considerations are present, at process block 114, the controller 42 may route portions of the bin stream to different transcode engines 58. In other words, the controller 42 may determine that multiple transcode engines 58 should be utilized to encode the bin stream, and the controller 42 may cause the multiple transcode engines 58 (e.g., the first transcode engine 58A and the second transcode engine 58B) retrieve a different portions of the bin stream (e.g., portions associated with even or odd coding rows), for example, via read direct memory access. Alternatively, the controller 42 may cause the read blocks 61 to retrieve the entire bin stream and generate a bit stream for a portion of the bin stream (e.g., utilizing parser blocks 62) that a particular entropy encoding block 64 will encode. After receiving a portion of the bin stream or generating a bit stream from the entire bin stream, the transcode engines 58 may generate encoded bit streams as discussed above.

However, if at decision block 112 the controller 42 determines that overriding power considerations are not present, the controller 42 may cause the bin stream to be routed to a single transcode engine 58 as discussed above with respect to process block 108.

Returning to the discussion of decision block 110, if the controller 42 determines that the expected latency is not greater than the latency threshold, at decision block 116, the controller 42 may determine whether there are any overriding power considerations present that, for example, may indicate that the bin stream should be encoded using a single transcode engine 58 instead of multiple transcode engines 58. In particular, the overriding power considerations associated with decision block 116 may include whether power source 26 (e.g., a battery) of the electronic device 10 is charging or an amount of power that the power source 26 can supply (e.g., battery life). For instance, when the power source 26 is not charging, the amount of power remaining on the power supply 26 is below a threshold amount (e.g., 10%, 20%, 25%, 50%, 75%, 80%, 85%, 90%, 95%, etc.) of a maximum battery life of the power supply 26, or both, the controller 42 may determine that overriding power considerations are present.

In response to determining at decision block 116 that overriding power considerations are present, the controller 42 may cause the bin stream to be routed to a single transcode engine 58 as discussed above with respect to process block 108. Conversely, in response to determining at decision block 116 that overriding power considerations are not present, the controller 42 may route portions of the bin stream to multiple transcode engines 58 as discussed above with respect to process block 114.

In some embodiments, the process 100 may include fewer operations than those discussed above. For example, in some embodiments, the process 100 may be performed without taking overriding power considerations (associated with one or both of decision blocks 112, 116) into account. For instance, in embodiments of the process 100 in which decision block 112 is omitted, upon determining at decision block 110 that the expected latency is greater than the latency threshold, the controller 42 may route the bin stream to a single transcode engine as discussed above with respect to process block 108. Additionally, in embodiments of the process 100 in which decision block 116 is omitted, upon determining at decision block 110 that the expected latency is not greater that the latency threshold, the controller 42 may route portions of the bin stream to multiple transcode engines as discussed above with respect to process block 114. Furthermore, it embodiments in which one or both of the decision blocks 112, 116 are omitted, the controller 42 may select the latency threshold from several threshold values that may be stored in the controller memory 46. For example, controller memory 46 may include a lookup table that correlates remaining battery life (e.g., associated with the power source 26 in embodiments of the electronic device in which the power source 26 is a battery) to a particular threshold latency. As another example, one latency threshold may be used when the power source 26 is charging, while a different latency threshold may be used when the power source is not charging (e.g., a pre-determined latency threshold or a latency threshold determined using the lookup table described above).

Furthermore, while the discussion of the process 100 includes an expected latency (e.g., at decision block 110), in other embodiments, an actual latency may be utilized. For example, after the transcode pipeline 50 has begun to encode a bin stream (e.g., utilizing either one or multiple transcode engines 58), the controller 42 may compare the actual latency to the latency threshold to reassess whether a single transcode engine 58 or multiple transcode engines 58 should be used. The controller 42 may also cause the transcode pipeline 50 to dynamically switch between utilizing a single transcode engine 58 and multiple transcode engines 58.

Furthermore, while the process 100 is discussed above with respect to causing one or two transcode engines 58 to be utilized, it should be noted that in other embodiments, the number of transcode engines 58 may be different. For example, in one embodiment, the controller 42 may determine whether two or four transcode engines 58 will be used to encode image data. As another example, the controller 42 may determine whether four or eight transcode engines 58 will be utilized to encode image data. In other words, the controller 42 may determine whether to operate using a higher throughput (e.g., using one number of transcode engines 58) or lower latency (e.g., using a fewer number of transcode engines 58).

Accordingly, the technical effects of the present disclosure include facilitating improved output rate of encoded image data, for example, to facilitate real-time or near real-time display and/or transmission. In particular, output rate may be improved by controlling whether a single transcode engine or multiple transcode engines are utilized to encode image data (e.g., a bin stream). For example, in situations in which relatively low resolution content (e.g., content having a bit rate lower than a threshold bit rate), the latency of a transcode pipeline that includes several transcode engines configured to encode different portions of image data in parallel may be reduced by utilizing only a single transcode engine. Furthermore, the techniques described in the present disclosure enable power considerations to be taken into account when determining whether to use a single transcode engine or multiple transcode engines. Accordingly, the presently disclosed techniques may also reduce power consumed when encoding image data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
video encoding pipeline circuitry configured to encode source image data, wherein the video encoding pipeline circuitry comprises a first transcode engine and a second transcode engine; and processing circuitry configured to:
   determine a target throughput for a bin stream;
   determine whether to encode the bin stream using only the first transcode engine or both the first and second transcode engines based on:
      determining whether the target throughput is greater than a throughput threshold; and
      when the target throughput is greater than the throughput threshold, determining whether an expected latency associated with encoding the bin stream is greater than a latency threshold; and
   based on determining whether to encode the bin stream using only the first transcode engine or both the first and second transcode engines, cause only the first transcode engine to encode the bin stream or both the first and second transcode engines to encode the bin stream.

2. The electronic device of claim 1, wherein the processing circuitry is configured to:
   determine to encode the bin stream using only the first transcode engine based on determining that the target throughput is not greater than the throughput threshold; and
   cause the bin stream to be encoded using only the first transcode engine.

3. The electronic device of claim 1, wherein the throughput threshold corresponds to a maximum encoding throughput of the first transcode engine or a portion thereof.

4. The electronic device of claim 1, comprising a battery, wherein the processing circuitry is configured to determine whether to encode the bin stream using only the first transcode engine or both the first and second transcode engines based on:
   whether the battery is charging;
   a remaining battery life of the battery; or
   both.

5. The electronic device of claim 1, comprising memory configured to store the bin stream, wherein the video encoding pipeline circuitry comprises a main pipeline configured to generate the bin stream from the source image data.

6. The electronic device of claim 1, wherein the electronic device comprises a portable phone, a media player, a personal data organizer, a handheld game platform, a tablet device, a computer, or any combination thereof.

7. The electronic device of claim 1, wherein when the first and second transcode engines are utilized to encode the bin stream, the first and second transcode engines are configured to encode the bin stream by encoding different portions of the bin stream in parallel.

8. A tangible, non-transitory, computer-readable medium comprising instructions that, when executed by one or more processors of an electronic device, cause the one or more processors to:
   determine a target throughput for a bin stream to be encoded by an encoding pipeline, wherein the encoding pipeline comprises a first transcode engine and a second transcode engine configured to encode the bin stream;
   determine whether to encode the bin stream using only a first transcode engine or both the first and second transcode engines based on:
      determining whether the target throughput is greater than a throughput threshold; and
      when the target throughput is greater than the throughput threshold, determining whether an expected latency associated with encoding the bin stream is greater than a latency threshold; and
   cause the bin stream to be encoded using only the first transcode engine in response to determining to encode the bin stream using only the first transcode engine.

9. The tangible, non-transitory, computer-readable medium of claim 8, wherein the instructions, when executed, cause the one or more processors to determine whether to encode the bin stream using only the first transcode engine or both the first and second transcode engine based on a current application running on the electronic device.

10. The tangible, non-transitory, computer-readable medium of claim 8, wherein the instructions, when executed, cause the one or more processors to whether to encode the bin stream using only the first transcode engine or both the first and second transcode engine based on a remaining battery life of a battery of the electronic device.

11. The tangible, non-transitory, computer-readable medium of claim 8, wherein the instructions, when executed, cause the one or more processors to cause a main pipeline of the encoding pipeline to generate the bin stream from source image data.

12. The tangible, non-transitory, computer-readable medium of claim 8, wherein the instructions, when executed, cause the one or more processors to cause the second transcode engine to be powered off when the bin stream is encoded using only the first transcode engine.

13. A method for encoding image data, the method comprising:
   determining, via processing circuitry, a target throughput of a bin stream to be encoded by a video encoding pipeline, wherein the video encoding pipeline comprises a first transcode engine and a second transcode engine;
   determining, via the processing circuitry, whether the target throughput is greater than a throughput threshold;
   in response to determining the target throughput is not greater than the throughput threshold causing, via the processing circuitry, the bin stream to be encoded using only the first transcode engine; and
   in response to determining the target throughput is greater than the throughput threshold:
      determining, via the processing circuitry, whether an expected latency associated with encoding the bin stream is greater than a latency threshold; and
      causing, via the processing circuitry, the bin stream to be encoded using only the first transcode engine or both the first and second transcode engines based on determining whether the expected latency is greater than the latency threshold.

14. The method of claim 13, comprising causing, via the processing circuitry, the bin stream to be encoded using only the first transcode engine after determining that the expected latency is greater than the latency threshold.

15. The method of claim 13, comprising causing, via the processing circuitry, the bin stream to be encoded using only the first transcode engine after determining that the expected latency is not greater than the latency threshold.

16. The method of claim 13, comprising causing, via the processing circuitry, the bin stream to be encoded using the first and second transcode engines in response to determining that the expected latency is not greater than the latency threshold.

17. The method of claim 13, comprising:
- after determining whether the expected latency is greater than the latency threshold, comparing, via the processing circuitry, a remaining battery life of a battery of an electronic device that includes the processing circuitry to a power threshold; and
- causing, via the processing circuitry, the bin stream to be encoded using only the first transcode engine or both the first and second transcode engines based on comparing the remaining battery life to the power threshold.

18. The method of claim 17, comprising causing, via the processing circuitry, the bin stream to be encoded using only the first transcode engine after determining:
- the expected latency is not greater than the latency threshold; and
- the remaining battery life is less than the power threshold.

19. The method of claim 17, comprising causing, via the processing circuitry, the bin stream to be encoded using only the first transcode engine after determining:
- the expected latency is greater than the latency threshold; and
- the remaining battery life is not greater than the power threshold.

20. The method of claim 17, comprising causing, via the processing circuitry, the bin stream to be encoded using the first and second transcode engines:
- after determining that the expected latency is greater than the latency threshold, determining that the remaining battery life is greater than the power threshold; and
- after determining that the expected latency is not greater than the latency threshold, determining that the remaining battery life is not less than the power threshold.

* * * * *